US009943202B2

(12) United States Patent
Eo et al.

(10) Patent No.: US 9,943,202 B2
(45) Date of Patent: Apr. 17, 2018

(54) DUST COLLECTOR AND VACUUM CLEANER HAVING THE SAME

(71) Applicant: LG ELECTRONICS INC., Seoul (KR)

(72) Inventors: Soohan Eo, Seoul (KR); Joonho Pyo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 420 days.

(21) Appl. No.: 14/642,374

(22) Filed: Mar. 9, 2015

(65) Prior Publication Data

US 2016/0088988 A1    Mar. 31, 2016

(30) Foreign Application Priority Data

Sep. 30, 2014  (KR) .......................... 10-2014-0131808

(51) Int. Cl.
| | |
|---|---|
| A47L 9/16 | (2006.01) |
| A47L 9/10 | (2006.01) |
| B01D 45/14 | (2006.01) |
| B04C 3/04 | (2006.01) |
| A47L 9/08 | (2006.01) |

(52) U.S. Cl.
CPC ............... *A47L 9/1608* (2013.01); *A47L 9/08* (2013.01); *A47L 9/108* (2013.01); *A47L 9/1616* (2013.01); *A47L 9/1683* (2013.01); *A47L 9/1691* (2013.01); *B01D 45/14* (2013.01); *B04C 3/04* (2013.01)

(58) Field of Classification Search
None
See application file for complete search history.

(56) References Cited

U.S. PATENT DOCUMENTS

| 2008/0271284 A1 | 11/2008 | Wood et al. |
| 2012/0102671 A1* | 5/2012 | Kwon .................... A47L 5/225 15/347 |
| 2014/0137363 A1 | 5/2014 | Wilson |

FOREIGN PATENT DOCUMENTS

| EP | 2 417 886 A1 | 2/2012 |
| JP | 4856271 B2 | 1/2012 |
| KR | 10-2009-0130244 A | 12/2009 |
| KR | 10-0985337 B1 | 10/2010 |

* cited by examiner

*Primary Examiner* — Christopher M Koehler
*Assistant Examiner* — Brian Keller
(74) *Attorney, Agent, or Firm* — Birch, Stewart, Kolasch & Birch, LLP

(57) ABSTRACT

A dust collector includes a first dust storing unit to collect dust firstly-separated from air by a first cyclone, a second dust storing unit to collect fine dust secondly-separated from the air by second cyclones located above the first cyclone, a lower cover part coupled to a first dust container to form a bottom surface of the first dust storing unit and the second dust storing unit, and rotatable about a hinge to simultaneously open the first and second dust storing units, such that the dust and the fine dust are simultaneously discharged, and a compression device rotatably connected to the lower cover part so as to rotate in a reciprocating manner to compress the dust collected in the first dust storing unit.

20 Claims, 8 Drawing Sheets

DUST COLLECTOR AND VACUUM CLEANER HAVING THE SAME

CROSS-REFERENCE TO RELATED APPLICATION

Pursuant to 35 U.S.C. § 119(a), this application claims the benefit of the earlier filing date and the right of priority to Korean Application No. 10-2014-0131808, filed on Sep. 30, 2014, the contents of which are incorporated by reference herein in their entirety.

BACKGROUND OF THE DISCLOSURE

1. Field of the Disclosure

This specification relates to a dust collector for a vacuum cleaner, capable of providing convenience specifically to a user who clears away dust after completion of cleaning, and a vacuum cleaner having the same.

2. Background of the Disclosure

A vacuum cleaner is an apparatus for sucking air using a suction force transferred from a suction motor, and discharging clean air by separating dust contained in the sucked air.

Vacuum cleaners may be classified into i) a canister type, ii) an upright type, iii) a hand type, iv) a floor type, and others.

The canister type vacuum cleaner is a vacuum cleaner which is the most widely used in households, and configured such that a suction nozzle and a main body communicate with each other through a connection pipe. The canister type vacuum cleaner is provided with a cleaner main body, a hose, a pipe, and a brush so as to perform cleaning by a suction force. Thus, this type is especially suitable for cleaning a hard floor.

On the other hand, the upright type vacuum cleaner has a shape that a suction nozzle and a main body are formed with each other. The upright type vacuum cleaner is provided with a rotatable brush, so as to clean up even dust within a carpet.

Vacuum cleaners require users to clear away dust (foreign materials, dirt, impurities, etc.) from a dust collector after the completion of cleaning. While discharging the dust from the dust collector, it is preferable that the dust is not discharged to an unexpected place.

However, the related art vacuum cleaners have limitations in view of providing users with convenience in the dust discharging process. There have been vacuum cleaners which scatter dust during the dust discharging process, and even vacuum cleaners requiring an excessively complicated dust discharging process.

Therefore, a dust collector which provides a user with improved convenience during a dust discharging process and a vacuum cleaner having the same are needed.

SUMMARY OF THE DISCLOSURE

Therefore, an aspect of the detailed description is to provide a dust collector having a structure capable of simultaneously discharging relatively large dust and fine dust by collecting the relatively large dust and the fine dust in a separate manner, and a vacuum cleaner having the same.

Another aspect of the detailed description is to provide a dust collector, capable of compressing dust and fine dust collected in a first dust storing unit and a second dust storing unit, respectively, such that the dust and the fine dust can be easily discharged from the dust collector, and a vacuum cleaner having the same.

To achieve these and other advantages and in accordance with the purpose of this specification, as embodied and broadly described herein, there is provided a dust collector including a first dust storing unit that is formed in a hollow cylindrical shape between an inner circumferential surface of a first dust container and an outer circumferential surface of a second dust container located in the first dust container, and configured to collect dust firstly-separated from air by a first cyclone, a second dust storing unit that is disposed to be surrounded by the first dust storing unit, and configured to collect fine dust secondly-separated from the air by second cyclones, located above the first cyclone, into a space formed by the second dust container, a lower cover part that is coupled to the first dust container by a hinge to form a bottom surface of the first dust storing unit and the second dust storing unit, and configured to rotate based on the hinge to simultaneously open the first dust storing unit and the second dust storing unit, such that the dust and the fine dust are simultaneously discharged, and a compression device that has at least part rotatably connected to the lower cover part, and configured to reciprocatingly rotate along the outer circumferential surface of the second dust container to compress the dust collected in the first dust storing unit.

In accordance with one embodiment disclosed herein, a discharge opening of the first dust storing unit and a discharge opening of the second dust storing unit may be formed to be open substantially in the same direction.

The lower cover part may include a first cover that is coupled to the first dust container by the hinge and configured to open and close the discharge opening of the first dust storing unit, and a second cover that is connected to the first cover and configured to open and close the discharge opening of the second dust storing unit in response to a rotation of the first cover based on the hinge.

The dust collector may further include a coupling member that is configured to couple the first dust container and the first cover to each other at an opposite side to the hinge, so as to prevent the separation of the first cover from the first dust container until before being released by an external force.

The compression device may include a rotation gear that is coupled to the first cover to be exposed to outside of the dust collector and configured to be rotatable by a driving force transferred through a gear of a cleaner main body, a first rotating portion that is provided at an opposite side to the rotation gear based on the first cover and connected to the rotation gear through the first cover so as to be rotatable along with the rotation gear upon the rotation of the rotation gear, a second rotating portion that is coupled to the second dust container to be relatively rotatable with respect to the second dust container, and configured to be engaged with the first rotating portion when the discharge opening of the second dust storing portion is closed by the lower cover portion, and a dust-compressive rotation plate that is connected to the second rotating portion to be rotatable along with the first rotating portion and the second rotating portion upon the rotation of the rotation gear, and configured to compress the dust collected in the first dust storing unit in a reciprocating rotation manner.

The dust collector may further include a dust-compressive fixing plate that is fixed to an area between the inner circumferential surface of the first dust container and the outer circumferential surface of the second dust container and configured to induce the reciprocating rotation motion of the dust-compressive rotation plate and restrict a movement of the dust compressed by the dust-compressive rotation plate.

The second dust container may be provided with a guide rail on an outer circumferential surface thereof to guide the rotation of the second rotating portion. The second rotating portion may be provided with a guide protrusion inserted into the guide rail, and be rotatable at the discharge opening of the second dust storing unit along the guide rail by virtue of the guide protrusion.

The first rotating portion may be provided with a plurality of protrusions that are radially formed based on a center of rotation thereof, and the second rotating portion may be provided with accommodating portions that are provided on the inner circumferential surface thereof and configured to accommodate therein end portions of the protrusions, respectively. The first rotating portion and the second rotating portion may be engaged with each other to be simultaneously rotatable in response to the end portions of the protrusions being inserted into the accommodating portions.

The protrusion and the accommodating portion may be provided with inclined surfaces, respectively, corresponding to each other, such that the protrusion and the accommodating portion are engaged with each other by being slid along the inclined surfaces even at a non-engaged position.

The second dust container may be spaced apart from the first cover. The first rotating portion and the second rotating portion may be disposed to be rotatable in a space formed between the second dust container and the first cover. The second cover may be installed on a rotation shaft of the first rotating portion and stepped from the first cover, so as to be inserted into the second dust storing unit.

The first cover may be provided with a first sealing member having a shape corresponding to the inner circumferential surface of the first dust container to seal the discharge opening of the first dust storing unit, and the second cover may be provided with a second sealing member having a shape corresponding to the inner circumferential surface of the second dust container to seal the discharge opening of the second dust storing unit.

At least part of the first sealing member may be inserted into the first dust storing unit when the first cover is coupled to the first dust container, pressed by the inner circumferential surface of the first dust container, and elastically changed in shape, and at least part of the second sealing member may be inserted into the second dust storing unit when the first cover is coupled to the first dust container, pressed by the inner circumferential surface of the second dust container, and elastically changed in shape.

The second cover may be connected to the first rotating portion to be relatively rotatable with respect to the first rotating portion. The second sealing member may restrict the rotation of the second cover by a frictional force, which is generated in response to the second sealing member coming in contact with the inner circumferential surface of the second dust container upon the rotation of the first rotating portion, so as to seal the discharge opening of the second dust storing unit.

The dust collector may further include a bearing which is coupled to a rotation shaft of at least one of the rotation gear and the first rotating portion to facilitate the rotation of the compression device.

The compression device may further include a fine dust-compressive rotation plate that is connected to the second rotating portion to be rotatable along with the first rotating portion and the second rotating portion upon the rotation of the rotation gear, and configured to compress the fine dust collected in the second dust storing unit in a reciprocating rotation manner.

A rotation shaft of the fine dust-compressive rotation plate may be connected to the rotation shaft of the second rotating portion through the second cover.

The fine dust-compressive rotation plate may be inserted into the second dust storing unit when the first cover rotates based on the hinge to close the first dust storing unit and the second dust storing unit. The fine dust-compressive rotation plate may be drawn out of the second dust storing unit when the first cover rotates based on the hinge to open the first dust storing unit and the second dust storing unit.

The dust collector may further include a fine dust-compressive fixing plate that is fixed in the second dust storing unit and configured to induce the reciprocating rotation motion of the fine dust-compressive rotation plate and restrict a movement of the fine dust compressed by the fine dust-compressive rotation plate.

The fine dust-compressive fixing plate may protrude from the inner circumferential surface of the second dust container toward the rotation shaft of the fine dust-compressive rotation plate.

To achieve these and other advantages and in accordance with the purpose of this specification, as embodied and broadly described herein, there is provided a vacuum cleaner having a dust collector. The vacuum cleaner includes a cleaner main body, a suction part that is configured to suck air containing foreign materials into the cleaner main body by a suction force generated in the cleaner main body, and a dust collector that is configured to separate the foreign materials from the air sucked through the suction part and collect the separated foreign materials. The dust collector may include a first dust storing unit that is formed in a hollow cylindrical shape between an inner circumferential surface of a first dust container and an outer circumferential surface of a second dust container located in the first dust container, and configured to collect dust firstly-separated from air by a first cyclone, a second dust storing unit that is disposed to be surrounded by the first dust storing unit, and configured to collect fine dust secondly-separated from the air by second cyclones, located above the first cyclone, into a space formed by the second dust container, a lower cover part that is coupled to the first dust container by a hinge to form a bottom surface of the first dust storing unit and the second dust storing unit, and configured to rotate based on the hinge to simultaneously open the first dust storing unit and the second dust storing unit, such that the dust and the fine dust are simultaneously discharged, and a compression device that has at least part rotatably connected to the lower cover part, and configured to reciprocatingly rotate along the outer circumferential surface of the second dust container to compress the dust collected in the first dust storing unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
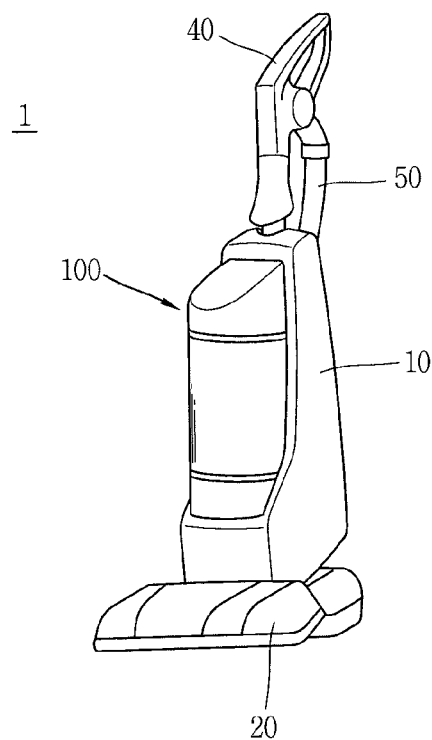
FIG. 1 is a conceptual view of an upright type vacuum cleaner disclosed herein.

Description will now be given in more detail of a dust collector and a vacuum cleaner having the same according to the present invention, with reference to the accompanying drawings. Hereinafter, the same/like reference numerals are provided to the same/like components even in different embodiments, and description thereof will not be repeated.

Figure 2:
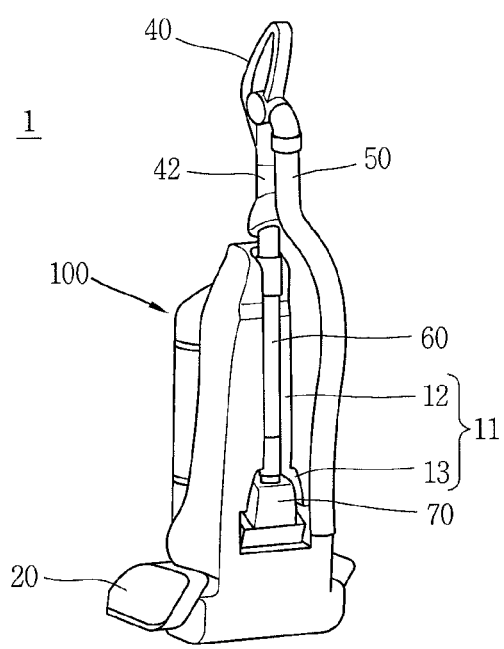
FIG. 2 is a conceptual view of the upright type vacuum cleaner illustrated in FIG. 1, viewed in another direction.

FIG. 1 is a conceptual view of an upright type vacuum cleaner 1 disclosed herein, and FIG. 2 is a conceptual view of the upright type vacuum cleaner 1 illustrated in FIG. 1, viewed in another direction.

As illustrated in FIGS. 1 and 2, the upright type vacuum cleaner 1 includes a cleaner main body 10 having a suction motor (not illustrated) for generating a suction force, a suction unit 20 rotatably connected to a lower side of the cleaner main body 10 and placed on a floor (bottom surface), a dust collector 100 detachably mounted to the cleaner main body 10, a sub suction unit including a suction pipe 60 and a nozzle 70 detachably provided at the cleaner main body 10 and configured to clean up the floor or a portion other than the floor, a handle 40 provided at an upper portion of the cleaner main body 10, and a connection hose 50 connected to the handle 40 and the cleaner main body 10.

A suction opening, through which dust and the like on the floor and air are sucked, is formed on a bottom surface of the suction unit 20. An agitator, for inducing dust or foreign materials into the suction opening, is rotatably coupled to an inner side of the suction opening.

The dust collector 100 may be detachably provided at the front of the cleaner main body 10, and the suction pipe 60 and nozzle 70 of the sub suction unit may be detachably provided at the rear of the cleaner main body 10. The suction motor is located at a lower side in the main body 10. The dust collector 100 is mounted to the main body above the suction motor. Of course, the location of the suction motor is not limited to the lower side of the main body.

Air which is sucked by the suction force generated in response to rotation of the suction motor flows through the dust collector 100. During this process, dust and fine dust are separated from the air to be stored in the dust collector 100.

The nozzle 70 is provided for cleaning up the floor or the portion other than the floor. The suction pipe 60 connects the nozzle 70 to the handle 40. A mounting unit 11 for mounting the sub suction unit is formed on a rear surface of the main body 10. The mounting unit 11 is provided with a suction pipe mounting portion 12 at which the suction pipe 60 is located, and a nozzle mounting portion 13 at which the nozzle is located.

A passage (not illustrated), along which dust and air sucked through the nozzle 70 flow, is formed in the handle 40. The connection hose 50 allows the dust and the air sucked through the nozzle 70 to flow toward the main body 10.

The connection hose 50 may be length-adjustable, and made of a flexible material to be freely movable. A driving wheel is provided at a lower side of the rear surface of the main body 10.

Hereinafter, description will be given of a dust collector which can be applied to the illustrated upright type vacuum cleaner 1 having the configuration.

Figure 3:
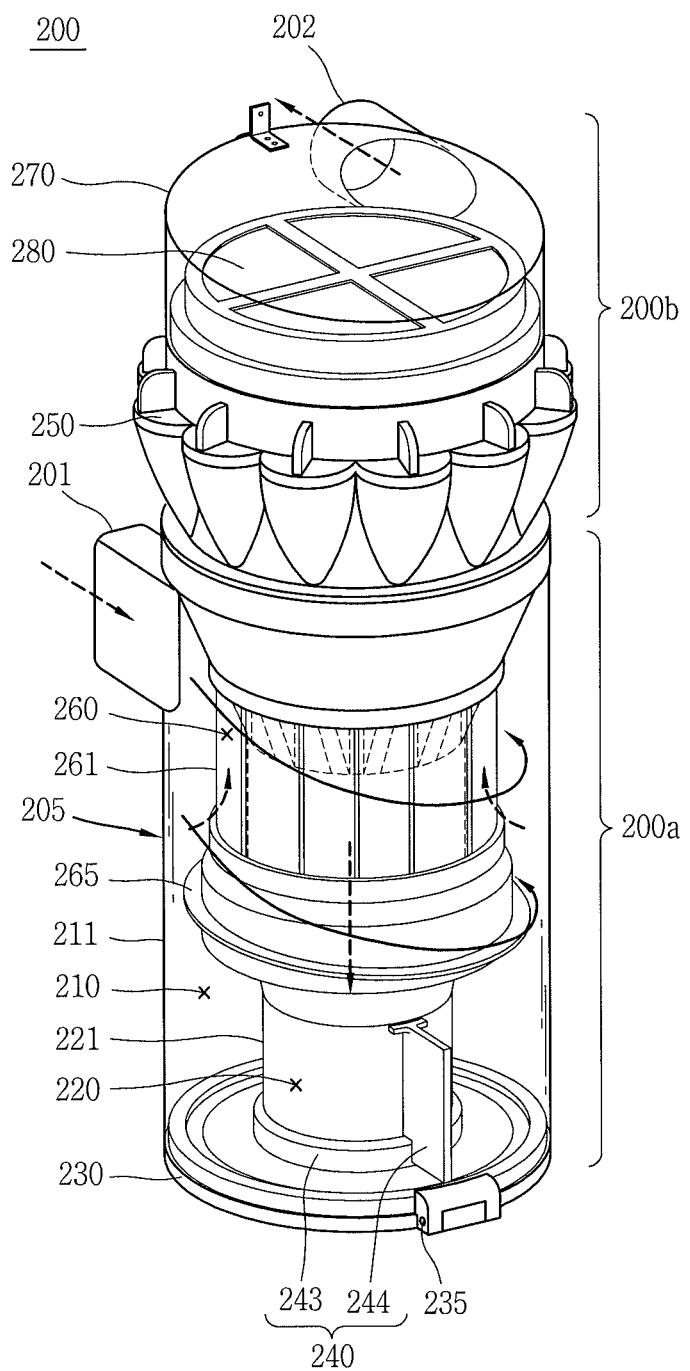
FIG. 3 is a perspective view of a dust collector in accordance with one exemplary embodiment disclosed herein.
Figure 4:
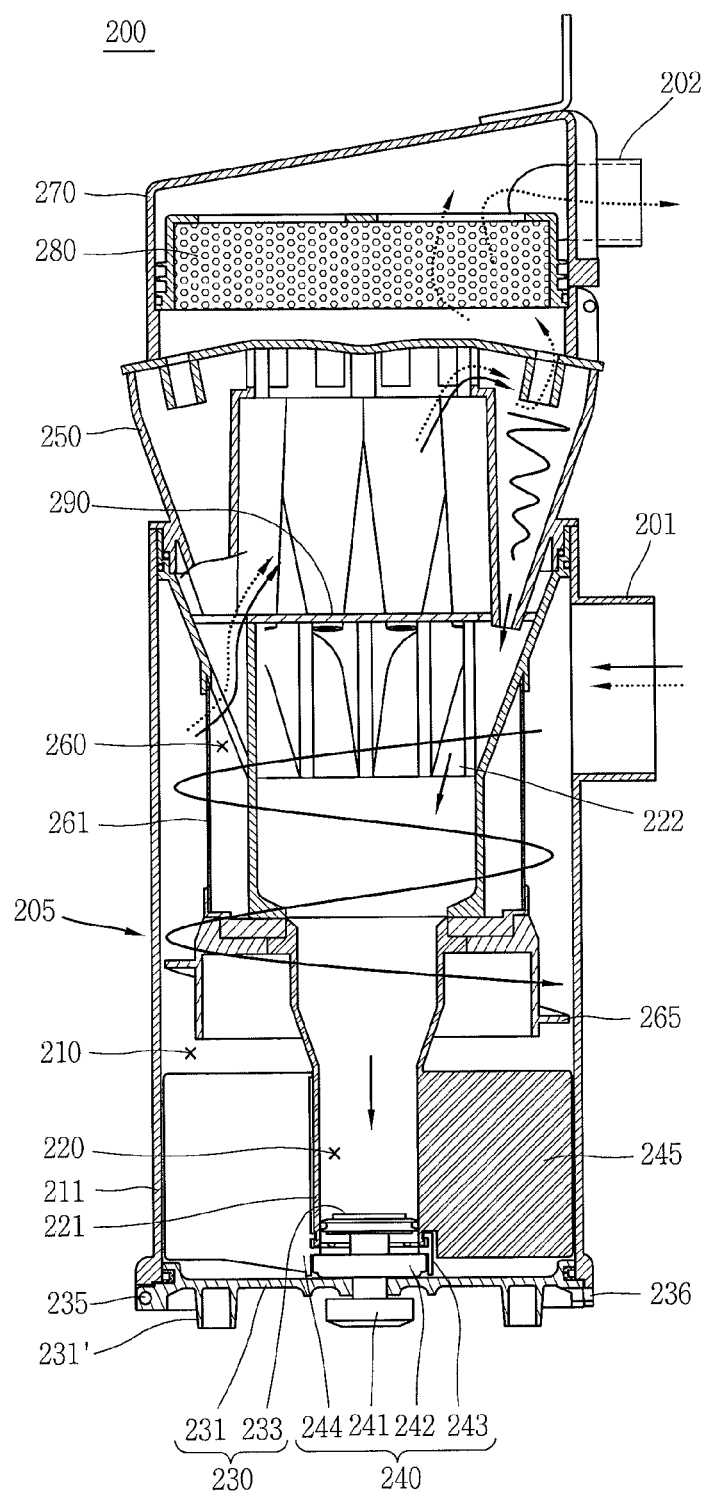
FIG. 4 is a sectional view illustrating an inner structure of the dust collector illustrated in FIG. 3.
Figure 5:
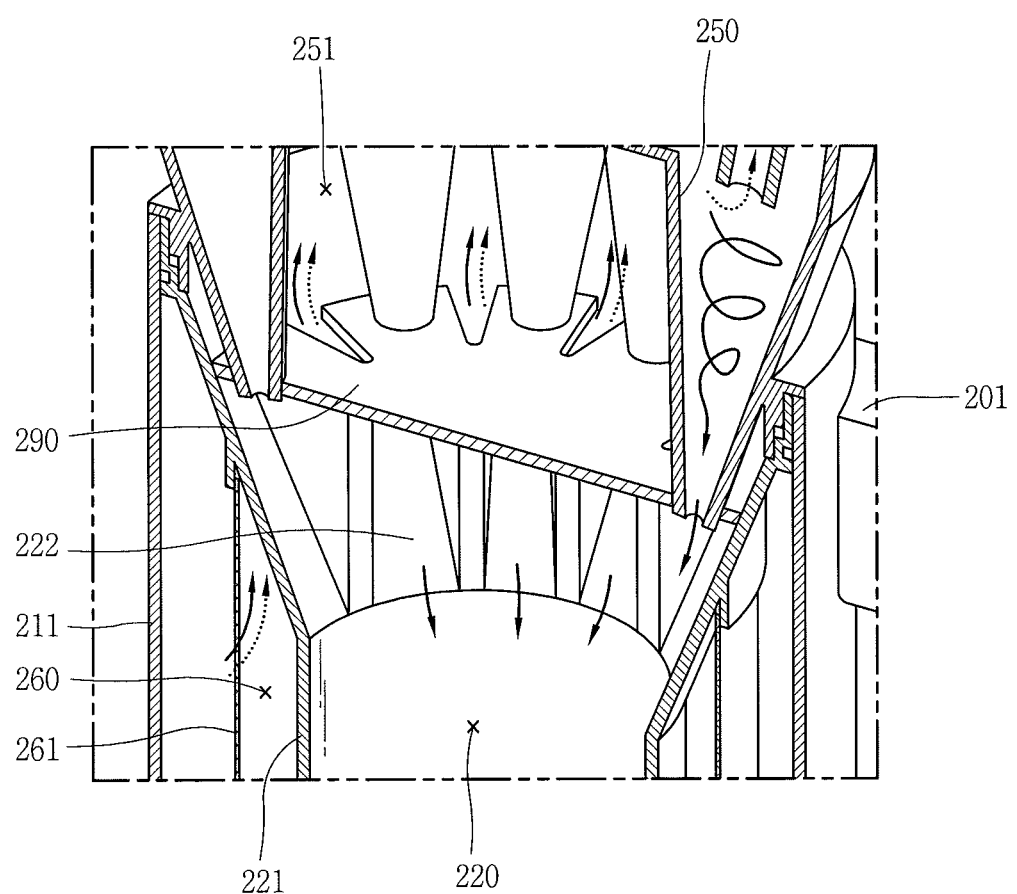
FIG. 5 is a conceptual view of the inner structure of the dust collector illustrated in FIG. 4, viewed in another direction.

FIGS. 3 to 5 illustrate an overall configuration of a dust collector, and the flow of air and foreign materials within the dust collector. A detailed structure related to the feature of the present disclosure will be explained later with reference to FIGS. 6 to 8.

FIG. 3 is a perspective view of a dust collector 200 in accordance with one exemplary embodiment disclosed herein, FIG. 4 is a sectional view illustrating an inner structure of the dust collector 200 illustrated in FIG. 3, and FIG. 5 is a conceptual view of the inner structure of the dust collector 200 illustrated in FIG. 4, viewed in another direction.

The dust collector 200 may include a first cyclone 205, a plurality of second cyclones 250, a first dust storing unit 210, a second dust storing unit 220, a lower cover part 230, and a compression device 240. The dust collector 200 is illustrated to be applied to the upright type vacuum cleaner 1 illustrated in FIGS. 1 and 2. However, the structure of the dust collector 200 illustrated herein may not be limited only to be applied to the upright type vacuum cleaner 1, but may also be applied to a canister type vacuum cleaner.

Referring to FIGS. 3 to 5, the dust collector 200 disclosed herein has a structure that collects dust and fine dust in a separate manner and simultaneously discharges the collected dust and fine dust.

External air and foreign materials are introduced into an inlet 201 of the dust collector 200 by a suction force generated in a suction motor of the vacuum cleaner. The air introduced in the inlet 201 of the dust collector 200 is filtered sequentially through the first cyclone 205 and the second cyclones 250 while flowing along a passage, and then discharged through an outlet 202. The dust and the fine dust separated from the air are collected in the dust collector 200.

A cyclone refers to a device which performs an orbiting motion to separate particles by a centrifugal force applied to the particles. The cyclone separates foreign materials, such as dust or fine dust, from air introduced into a cleaner main body by a suction force. Herein, relatively large dust is referred to as "dust," relatively small dust is referred to as "fine dust", and dust smaller than "fine dust" is referred to as "ultrafine dust."

The first cyclone 205 of the dust collector 200 illustrated in FIG. 3 is configured by a first dust container (dust bin, dust tank, etc.) 211, a second dust container 221, and a mesh filter 261. The first cyclone 205 primarily (firstly) separates dust from air introduced into the dust collector 200. Air and foreign materials introduced into the first dust storing unit 210 through the inlet 201 of the dust collector 200 are separated from each other by the first cyclone 205.

Relatively heavy dust is gradually moved downward by centrifugal and gravitational forces while spirally orbiting in an area between an inner circumferential surface of the first dust container 211 and the mesh filter 261. A vane 265 which forms a spiral passage for guiding the orbiting motion of the dust is provided at a lower end of the mesh filter 261. The dust separated from the air is guided by the vane 265 provided at the lower end of the mesh filter 261 to be collected in the first dust storing unit 210.

A size of dust and fine dust may be determined by the mesh filter 261. Foreign material small enough to pass through a hole of the mesh filter 261 may be classified as fine dust, and foreign material large enough to be unable to pass through the hole of the mesh filter 261 may be classified as dust.

The dust collector 200 may be divided based on the first cyclone 205 and the second cyclones 250 into a first section 200a where the first cyclone 205 is located, and a second section 200b where the second cyclones 250 are located. The inlet 201 of the dust collector 200 is located at a top of the first section 200a, and the outlet 202 of the dust collector 200 is located at a top of the second section 200b.

Air and fine dust, whose particles are smaller than dust, may flow through holes of the mesh filter 261. Air and the fine dust, which are relatively lighter than the dust, may be introduced by the suction force of the suction motor into a space between the mesh filter 261 and the second dust container 221. The air and the fine dust flow from the first section 200a to the second section 200b through a connection passage 260 which is formed between the mesh filter 261 and an outer circumferential surface of the second dust container 221.

Referring to FIG. 4, an inner structure of the dust collector 200 can be understood.

The air and the fine dust introduced into the second section 200b through the connection passage 260 are distributed into the plurality of second cyclones 250, which are arranged into a circular shape along a circumference of the second section 200b. The second cyclones 250, similar to the first cyclone 205, separate the fine dust from the air using the centrifugal force.

The air and the fine dust spirally orbit within the second cyclones 250.

Air which is relatively lighter than the fine dust is discharged upward by a suction force of the second cyclones 250. The air is then discharged through the outlet 202 formed at the top of the second section 200b. A porous prefilter 280 is installed on a passage which extends from the second cyclones 250 to the outlet 202 of the dust collector 200. The prefilter 280 filters out ultrafine dust from the air.

An upper cover 270 is provided on the top of the dust collector 200. When the upper cover 270 is open, the prefilter 280 is exposed. The prefilter 280 may be detachable from the dust collector 200 for washing.

Relatively small fine dust is discharged to a lower side of the second cyclones 250. The fine dust is moved down by gravity and collected in the second dust storing unit 220. An inclined portion 222 extending to the second dust storing unit 220 is formed below the second cyclones 250. The flow of the fine dust is guided by the inclined portion 222 from the second cyclones 250 to the second dust storing unit 220.

A shielding layer 290 is provided at a boundary between the first section 200a and the second section 200b. The shielding layer 290 is provided to allow for a unidirectional flow. The shielding layer 290 may be disposed to be surrounded by the second cyclones 250. If the shielding layer 290 is not provided, the fine dust discharged to the lower side of the second cyclones 250 may flow back toward an inlet of the second cyclones 250 due to the suction force of the suction motor. The shielding layer 290 prevents the fine dust from flowing back toward the inlet of the second cyclones 250, thereby avoiding such problem.

Referring to FIG. 5, a housing 251 for fixing the second cyclones 250 may be formed on a circumference of the plurality of second cyclones 250 arranged into the circular shape. The housing 251 may be formed integrally with the second cyclones 250. Each of the second cyclones 250 may be formed in a conic shape such that an inner diameter becomes narrower towards a lower end thereof. With the structure, even if upper portions of the second cyclones 250 come in contact with one another, lower portions of the second cyclones 250 may be spaced apart from one another. A space through which the air and the fine dust can flow is formed between the adjacent second cyclones 250.

The shielding layer 290 does not shield each space between the adjacent second cyclones 250. The connection passage 260 which forms the passage extending from the first section 200a to the second section 200b is connected to the spaces among the second cyclones 250. Hence, as indicated with arrows in FIG. 5, the air and the fine dust may flow from the first section 200a to the second section 200b through the spaces among the second cyclones 250. The fine dust that flows into the second section 200b may be distributed into the second cyclones 250 in a space surrounded by the second cyclones 250.

Referring back to FIGS. 3 and 4, the first dust storing unit 210 is configured to collect therein the dust which has been firstly separated from the air by the first cyclone 205. The first dust storing unit 210 is formed in a hollow cylindrical shape between an inner circumferential surface of the first dust container 211 and an outer circumferential surface of the second dust container 221. A bottom surface of the first dust storing unit 210 is formed by a lower cover part 230, and dust is mainly piled up on the lower cover part 230.

The first dust container 211 and the second dust container 221 are constituting elements of the first dust storing unit 210. The first dust container 211 defines an outer appearance of the dust collector 200, and the second dust container 221 is located within the first dust container 211. The first dust container 211 and the second dust container 221 may be formed in a cylindrical shape, as illustrated in FIG. 3.

The second dust storing unit 220 is disposed to be surrounded by the first dust storing unit 210. The second storing unit 220, as illustrated in FIG. 3, may be disposed in the middle of the first dust storing unit 210. The second storing unit 220 is configured to collect therein the fine dust which has been secondly separated from the air by the second cyclones 250. Unlike the first dust storing unit 210 which is formed by the first dust container 211, the second dust container 221 and the lower cover part 230, the second dust storing unit 220 is formed by the second dust container 221 and the lower cover part 230.

The lower cover part 230 is coupled to the first dust container 211 by a hinge 235, so as to form a bottom surface of the first dust storing unit 210 and the second dust storing unit 220. A discharge opening of the first dust storing unit 210 is maintained in an air-tight state by the lower cover part 230, whereby the dust collected in the first dust storing unit 210 can be prevented from leaking out of the dust collector 200. Also, a discharge opening of the second dust storing unit 220 is maintained in the air-tight state by the lower cover part 230, whereby the fine dust collected in the second dust storing unit 220 can be prevented from leaking out of the first dust storing unit 210 or the dust collector 200.

If the dust piled on the lower cover part 230 is dispersed without being gathered at one place, the dust piled on the lower cover part 230 may be likely to be scattered or discharged to an unexpected place during a dust discharging process. To overcome the problem, the compression device 240 is used to compress the dust collected in the first dust storing unit 210.

At least a part of the compression device 240 is rotatably connected to the lower cover part 230. The compression device 240 rotates along an outer circumferential surface of the second dust container 221 in a reciprocating manner to compress the dust collected in the first dust storing unit 210. The dust collected in the first dust storing unit 210 is compressed by the compression device 240 and gathered on a partial area of the first dust storing unit 210. Accordingly, the scattering of the dust during the dust discharging process can be prevented, and the probability that the dust is discharged to the unexpected place can be remarkably reduced.

Figure 6:
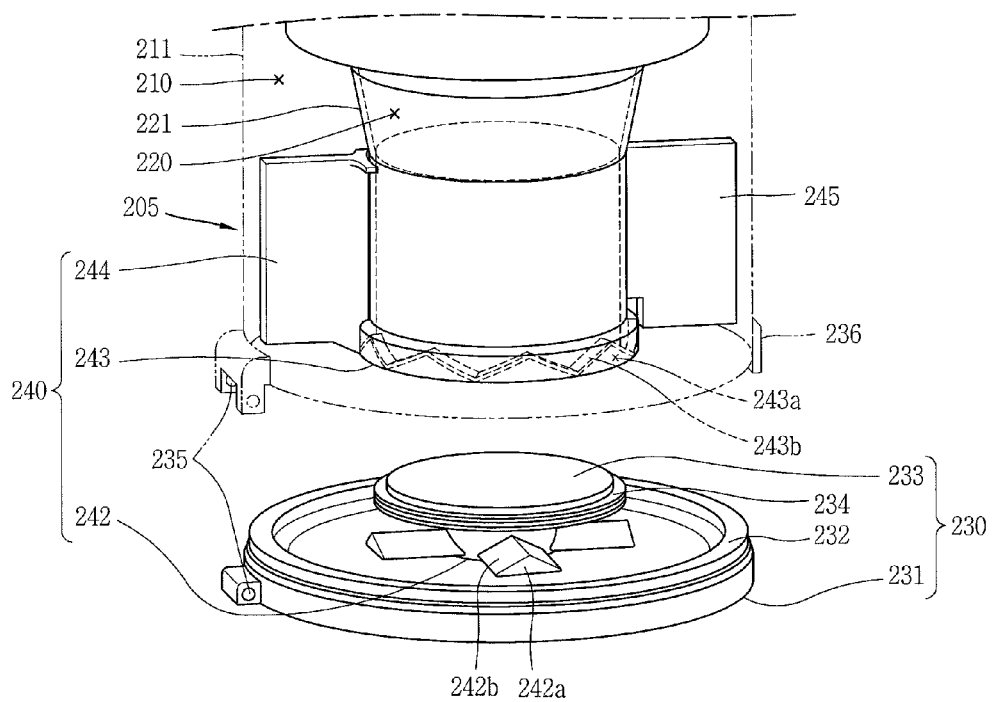
FIG. 6 is a disassembled perspective view of the dust collector.

FIG. 6 is a disassembled perspective view of the dust collector 200.

As illustrated in FIG. 6, the discharge opening of the first dust storing unit 210 and the discharge opening of the second dust storing unit 220 may be formed to be open substantially in the same direction. The lower cover part 230 rotates based on the hinge 235 to simultaneously open the first dust storing unit 210 and the second dust storing unit 220, such that the dust and the fine dust can be simultaneously discharged.

The lower cover part 230 includes a first cover 231 and a second cover 233.

The first cover 231 is coupled to the first dust container 211 by the hinge 235. The first cover 231 is configured to open and close the discharge opening of the first dust storing unit 210. The first cover 231 is provided with a first sealing member 232 on an outer circumferential surface thereof to seal the discharge opening of the first dust storing unit 210. The first sealing member 232 is formed in an annular shape to correspond to the inner circumferential surface of the first dust container 211. When the first cover 231 is coupled to the first dust container 211, at least part of the first sealing member 232 is inserted into the first dust storing unit 210 and pressed by the inner circumferential surface of the first dust container 211, so as to be elastically changed in shape. The first cover 231 may thus seal the discharge opening of the first dust storing unit 210 by virtue of the first sealing member 232.

The second cover 233 is connected to the first cover 232 so as to open and close the discharge opening of the second dust storing unit 220 in response to the rotation of the first cover 231 based on the hinge 235. Since the second cover 233 is connected with the first cover 231, when the first cover 231 rotates centering on the hinge 235, the second cover 233 rotates along with the first cover 231. Therefore, the lower cover part 230 may simultaneously open the first dust storing unit 210 and the second dust storing unit 220.

The second cover 233 is provided with a second sealing member 234 on an outer circumferential surface thereof to seal the discharge opening of the second dust storing unit 220. The second sealing member 234 is formed in an annular shape to correspond to the inner circumferential surface of the second dust container 221. When the first cover 231 seals the first dust container 211, at least a part of the second sealing member 234 is inserted into the second dust storing unit 220 and pressed by the inner circumferential surface of the second dust container 221, so as to be elastically changed in shape. The second cover 233 may thus seal the discharge opening of the second dust storing unit 220 by virtue of the second sealing member 234.

The dust collector 200 includes a coupling member 236 which prevents separation of the first cover 231 from the first dust container 211 until the coupling member 236 is released by an external force. The coupling member 236 couples the first dust container 211 and the first cover 231 to each other at an opposite side of the hinge 235.

The coupling member 236 may be implemented as a button-type hook, for example. When the first cover 231 rotates based on the hinge 235 to be closely adhered onto the first dust container 211, the hook is naturally stopped on the first cover 231, such that the first dust container 211 and the first cover 231 are coupled to each other. When a user pushes a button, the stopped hook is released, and accordingly the first cover 231 rotates centering on the hinge 235 so as to simultaneously open the first dust storing unit 210 and the second dust storing unit 220.

When the user desires to discharge the dust and the fine dust from the dust collector 200, the coupling by the coupling member 236 is to be released. As soon as the coupling by the coupling member 236 is released, the lower cover part 230 rotates centering on the hinge 235 by gravity. Accordingly, the user can easily discharge the dust collected in the first dust storing unit 210 and the fine dust collected in the second dust storing unit 220 at the same time. This may allow the user to avoid the inconvenience of having to discharging the dust and the fine dust by two separate operations.

Specifically, the dust collector 200 disclosed herein includes the compression device 240 which is configured to compress the dust collected in the first dust storing unit 210. The dust collected in the first dust storing unit 210 is compressed onto a partial area of the first dust storing unit 210 by the compression device 240. Therefore, upon employing the compression device 240 and the lower cover part 230, the user can be provided with convenience in view of easily discharging the compressed dust and fine dust in a simultaneous manner.

Hereinafter, detailed structure of the compression device 240 and the lower cover part 230 will be described with reference to FIGS. 6 and 7.

Figure 7:
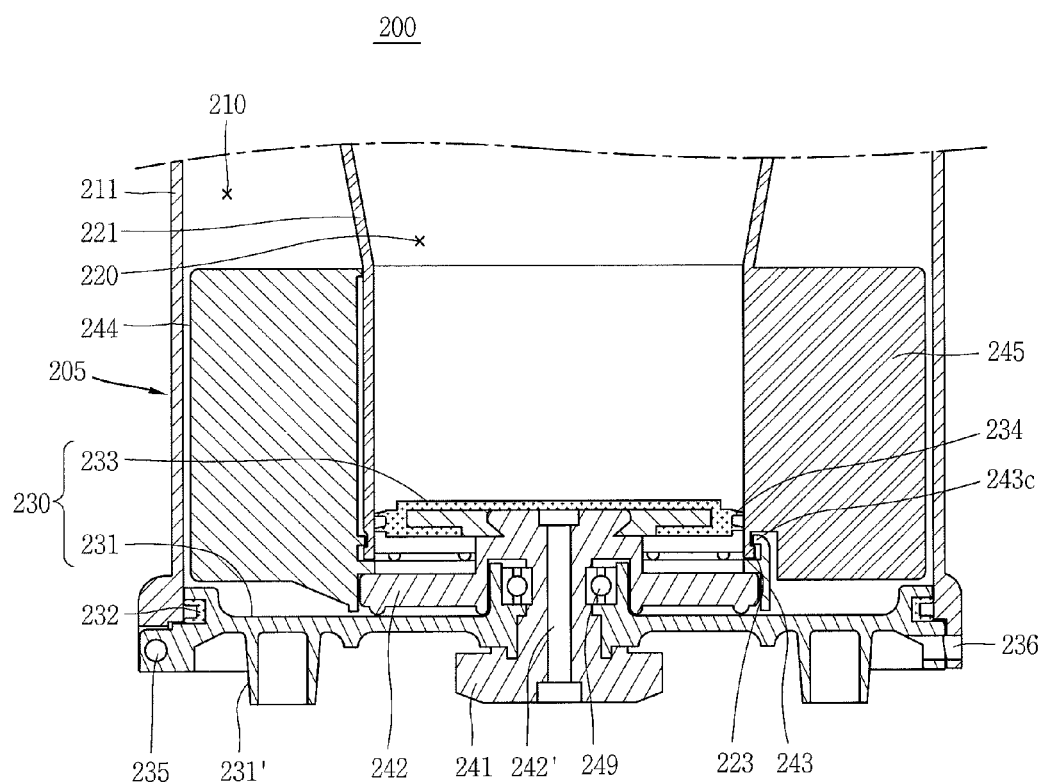
FIG. 7 is a sectional view of the dust collector.

FIG. 7 is a sectional view of the dust collector 200.

As illustrated in FIGS. 6 and 7, the compression device 240 includes a rotation gear 241, a first rotating portion 242, a second rotating portion 243, and a dust-compressive rotation plate 244.

The rotation gear 241 is not illustrated in FIG. 6 but illustrated in FIG. 7. When the dust collector 200 is coupled to the cleaner main body, the rotation gear 241 is engaged with a gear (not illustrated) of the cleaner main body.

The dust collector 200, as illustrated in FIG. 1, may be attachable to the cleaner main body or detachable from the cleaner main body. Referring to FIG. 7, a guide portion 231' for guiding the dust collector 200 to be coupled to a predetermined position of the cleaner main body may be provided on the first cover 231. The guide portion 231' protrudes from the first cover 231. The cleaner main body is provided with a space for accommodating the guide portion 231', and a groove corresponding to the guide portion 231' may be formed at the space for accommodating the dust collector 200. When the dust collector 200 is coupled to the cleaner main body, the dust collector 200 may be guided by the guide portion 231' and the groove so as to be aligned at the predetermined position. When the dust collector 200 is mounted onto the cleaner main body, the rotation gear 241 is engaged with the gear of the cleaner main body.

The gear of the cleaner main body receives a driving force transferred from a driving unit of the cleaner main body. The driving unit of the cleaner main body includes a motor, for example. When a repulsive force is applied in a direction opposite to a rotating direction of the motor, the rotating direction of the motor may be changed into an opposite direction. The motor of the driving unit is different from the suction motor.

Since the gear of the cleaner main body is engaged with the rotation gear 241, the driving force transferred to the gear of the cleaner main body is also transferred to the rotation gear 241. The rotation gear 241 is rotated by the driving force transferred through the gear of the cleaner main body.

The first rotating portion 242 is located at an opposite side to the rotation gear 241 based on the first cover 231. Therefore, when the first cover 231 is coupled to the first dust container 211 by the coupling member 236, the rotation gear 241 is exposed to the outside of the dust collector 200 but the first rotating portion 242 is disposed within the dust collector 200.

The first rotating portion 242 is connected with the rotation gear 241 through the first cover 231 so as to be rotatable along with the rotation gear 241 upon the rotation of the rotation gear 241. As illustrated in FIG. 7, the first rotating portion 242 may be formed integrally with the rotation gear 241.

The second rotating portion 243 is coupled to the second dust container 221 to be relatively rotatable with respect to the second dust container 221. As illustrated in FIG. 6, an end portion of the second dust container 221 is formed in the annular shape. Accordingly, the second rotating portion 243 may be formed in the annular shape to correspond to the end portion of the second dust container 221, so as to be coupled to the end portion of the second dust container 221. Although the second dust container 221 is fixed, the second rotating portion 243 may be relatively rotatable at the end portion of the second dust container 221.

Referring to FIG. 6, the first rotating portion 242 is provided with a plurality of protrusions 242a which are radially formed based on a center of rotation. The second rotating portion 243 is provided with accommodating portions 243a formed on an inner circumferential surface thereof such that end portions of the protrusions 242a are accommodated therein. While the first cover 231 is coupled to the first dust container 211 by the coupling member 236, the protrusions 242a are inserted into the accommodating portions 243a. Accordingly, the first rotating portion 242 and the second rotating portion 243 are engaged with each other so as to be rotatable simultaneously.

The protrusion 242a and the accommodating portion 243a are provided with inclined surfaces 242b and 243b corresponding to each other, respectively, so as to be slidably aligned with each other by inclination even at a position where they are not aligned with each other. While the lower cover part 230 seals the discharge opening of the first dust storing unit 210 and the discharge opening of the second dust storing unit 220, the first rotating portion 242 and the second rotating portion 243 are engaged with each other. During this process, each protrusion 242a may be inserted into the corresponding accommodating portion 243a at a non-engaged position with the accommodating portion 243a. Nevertheless, since the protrusion 242a and the accommodating portion 243a are provided with the inclined surfaces 242b and 243b, respectively, the first rotating portion 242 and the second rotating portion 243 may be relatively moved and naturally engaged with each other by being slid along the inclined surfaces 242b and 243b.

Referring to FIG. 7, the second dust container 221 is spaced apart from the first cover 231. The second cover 233 forms a stepped portion with the first cover 231 to be coupled to the second dust container 221. The first rotating portion 242 and the second rotating portion 243 are disposed to be rotatable in a space formed between the second dust container 221 and the first cover 231. The second cover 233 is installed on a rotation shaft 242' of the first rotating portion 242 so as to be inserted into the second dust storing unit 220. The second cover 233 may be provided with the stepped portion from the first cover 231 in order to be inserted into the second dust storing unit 220.

When the second cover 233 rotates along with the first rotating portion 242, the fine dust collected in the second dust storing unit 220 may be likely to be leaked out of the first dust storing unit 210 or the dust collector 200. To prevent the problem, the second cover 233 is connected to the first rotating portion 242 to be relatively rotatable with respect to the first rotating portion 242. The second sealing member 234 restricts the rotation of the second cover 233 by a frictional force, which is generated when the second sealing member 234 is brought into contact with the inner circumferential surface of the second dust container 221 upon the rotation of the first rotating portion 242, which results in sealing (closing) the discharge opening of the second dust storing unit 220. Therefore, even though the first rotating portion 242 rotates, the second cover 233 may rarely rotate due to the second sealing member 234. This configuration may prevent the leakage of the fine dust collected in the second dust storing unit 220.

The dust-compressive rotation plate 244 is connected to the second rotating portion 243 so as to be rotatable along with the first rotating portion 242 and the second rotating portion 243 upon the rotation of the rotation gear 241. As illustrated in FIG. 6, the dust-compressive rotation plate 244 may be formed integrally with the second rotating portion 243. The dust-compressive rotation plate 244 compresses the dust collected in the first dust storing unit 210 in a reciprocating rotation manner.

When a repulsive force is applied in an opposite direction to the rotating direction of the aforementioned driving unit (for example, the motor) of the cleaner main body, which supplies the driving force, the rotating direction of the driving unit may be changed to the opposite direction. The dust-compressive rotation plate 244 receives the driving force transferred through the gear of the cleaner main body, the rotation gear 241, the first rotating portion 242 and the second rotating portion 243. Therefore, when the rotating direction of the driving unit is changed to the opposite direction, the rotating direction of the dust-compressive rotation plate 244 may also be switched into the opposite direction.

The dust collector 200 further includes a dust-compressive fixing plate 245.

The dust-compressive fixing plate 245 is formed at an area between the inner circumferential surface of the first dust container 211 and the outer circumferential surface of the second dust container 221. The dust-compressive fixing plate 245 may have substantially the same shape as the dust-compressive rotation plate 244.

The dust-compressive fixing plate 245 induces the reciprocating rotation motion of the dust-compressive rotation plate 244. When the dust-compressive rotation plate 244 is moved close to the dust-compressive fixing plate 245 while rotating along the outer circumferential surface of the second dust container 221, a repulsive force is generated. Accordingly, the driving unit within the cleaner main body rotates in the opposite direction to its rotating direction. In response to the rotation, the gear of the cleaner main body, the rotation gear 241, the first rotating portion 242 and the second rotating portion 243, which are sequentially connected to the driving unit also, rotate in the opposite direction. Also, the dust-compressive rotation plate 244 connected to the second rotating portion 243 rotates in the opposite direction to its rotating direction.

Therefore, the dust-compressive rotation plate 244 performs the reciprocating rotation motion of repeating the rotation from one side to another side and the rotation from the another side to the one side based on the dust-compressive fixing plate 245. The dust collected in the first dust storing unit 210 is thus compressed onto both surfaces of the dust-compressive fixing plate 245 by the reciprocating rotation of the dust-compressive rotation plate 244.

The dust-compressive fixing plate 245 restricts a movement of the compressed dust. Since the dust-compressive fixing plate 245 is fixed, unlike the dust-compressive rotation plate 244, the compressed dust on both surfaces of the dust compression fixed plates is restricted from being moved by the dust-compressive fixing plate 245. Hence, even if the dust-compressive rotation plate 244 continuously rotates within the first dust storing unit 210 in the reciprocating manner, the dust-compressive fixing plate 245 can prevent scattering of the compressed dust.

The rotation of the compression device 240 may be guided by a guide rail 223 and a guide protrusion 243c. The second dust container 221 is provided with a guide rail 223 on its outer circumferential surface for guiding the rotation of the second rotating portion 243. The second rotating portion 243 is provided with the guide protrusion 243c inserted into the guide rail 223. The second rotating portion 243 may be rotatable at the discharge opening of the second dust storing unit 220 along the guide rail 223 by the guide protrusion 243c.

The dust collector 200 may further include a bearing 249 which facilitates the rotation of the compression device 240. The bearing 249 is coupled to the rotation shaft 242' of at least one of the rotation gear 241 and the first rotating portion 242. The rotation gear 241 and the first rotating portion 242 may be formed integrally with each other, and the bearing 249 may be provided by one or in plurality.

Figure 8:
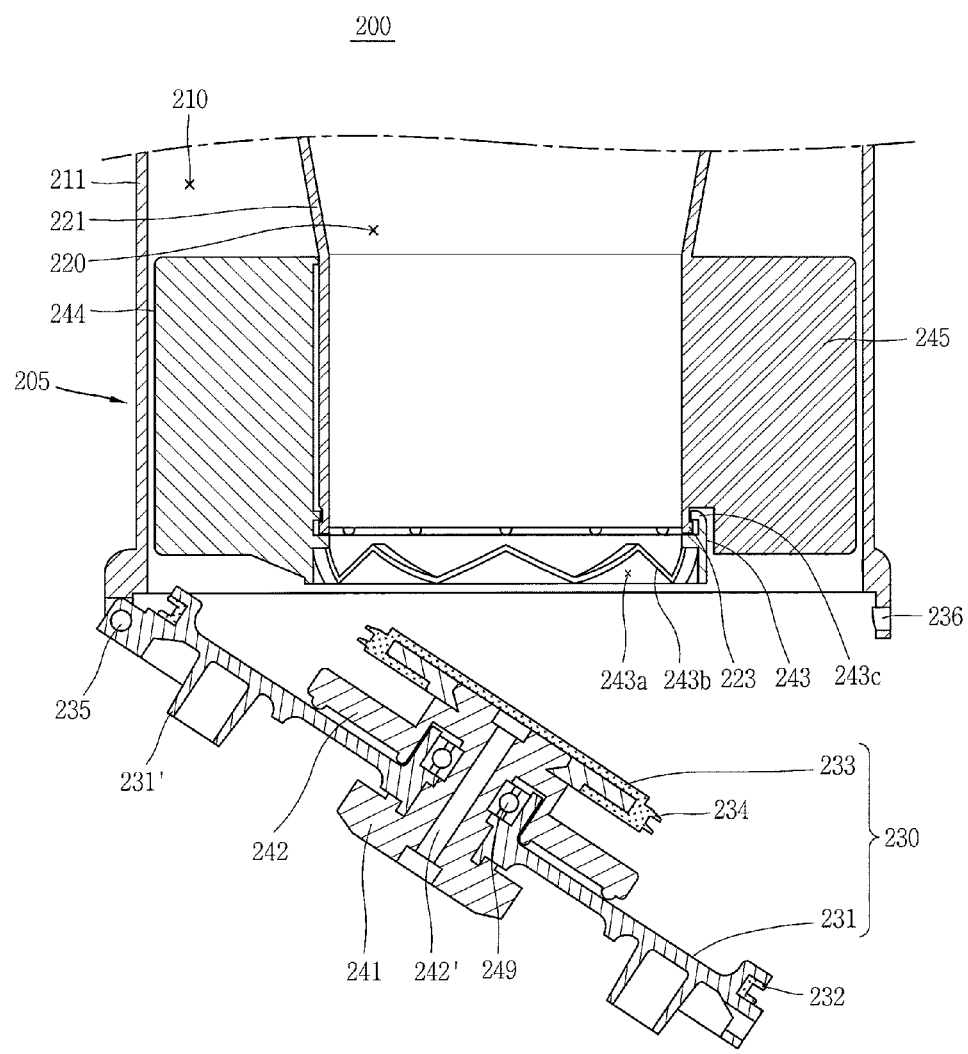
FIG. 8 is a sectional view illustrating the dust collector in a state that a lower cover part is open.

FIG. 8 is a sectional view illustrating the dust collector 200 in a state that the lower cover part 230 is open.

During the operation of the vacuum cleaner, the compression device 240 continuously compresses the dust collected in the first dust storing unit 210. Hence, the dust is present in a compressed state on both side surfaces of the dust-compressive fixing plate 245 at the time point when the operation of the vacuum cleaner is completed.

When the user releases the coupling of the coupling member 236 to discharge the dust and the fine dust collected in the dust collector 200, as illustrated in FIG. 8, the lower cover part 230 rotates based on the hinge 235 and thus opens the first dust storing unit 210 and the second dust storing unit 220.

When the first dust storing unit 210 and the second dust storing unit 220 are open, the first rotating portion 242 and the second rotating portion 243 in the engaged state with each other are separated from each other. Since the first rotating portion 242 is coupled to the lower cover part 230, it is moved along the lower cover part 230. The second rotating portion 243 remains connected to the second dust container 221. The guide rail 223 and the guide protrusion 243c may prevent the separation of the second rotating portion 243 from the second dust container 221, as well as guiding the rotation of the second rotating portion 243.

The lower cover part 230 forms the bottom surface of the first dust storing unit 210 and the second dust storing unit 220 and simultaneously opens the first dust storing unit 210 and the second dust storing unit 220. Therefore, upon employing this structure disclosed herein, the dust collected in the first dust storing unit 210 and the fine dust collected in the second dust storing unit 220 may be simultaneously discharged. Also, since the dust is compressed by the compression device 240, the dust can be prevented from being scattered and allowed to be easily discharged by gravity.

The present disclosure can optimize convenience in dust discharging, resulting from the compression of the dust using the compression device 240 and the simultaneous discharge of the dust and the fine dust using the lower cover part 230.

Hereinafter, another exemplary embodiment disclosed herein will be described.

Figure 9:
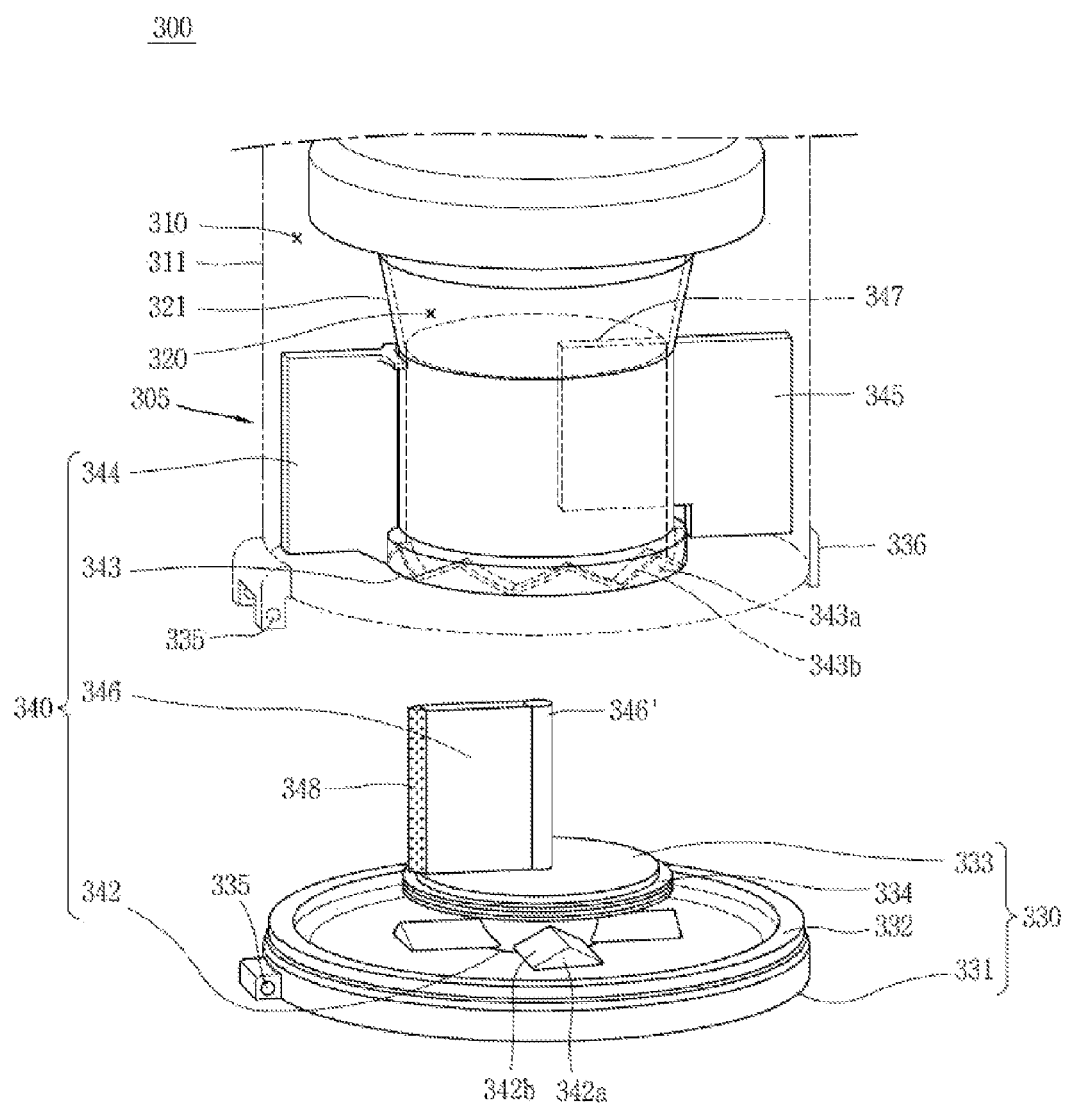
FIG. 9 is a disassembled perspective view of a dust collector in accordance with another exemplary embodiment disclosed herein.

FIG. 9 is a disassembled perspective view of a dust collector 300 in accordance with another exemplary embodiment disclosed herein.

Describing the configuration of the dust collector 300, the same/like elements as the foregoing embodiment will not be described again.

As shown in FIG. 9, the dust collector 300 may include a first dust container (dust bin, dust tank, etc.) 311, a second dust container 321, and a lower cover part 330.

The dust collector 300 illustrated in FIG. 9 is configured to compress even fine dust collected in a second dust storing unit 320 as well as dust collected in a first dust storing unit 310. A compression device 340 includes a rotation gear (not illustrated), a first rotating portion 342, a second rotating portion 343, a dust-compressive rotation plate 344, and a fine dust-compressive rotation plate 346.

The fine dust-compressive rotation plate 346 is connected to the first rotating portion 342 to be rotatable along with the first rotating portion 342 and the second rotating portion 343 upon the rotation of the rotation gear. In detail, a rotation shaft 346' of the fine dust-compressive rotation plate 346 may be connected to a rotation shaft (not illustrated) of the first rotating portion 342 through the second cover 333. When the first rotating portion 342 rotates, the fine dust-compressive rotation plate 346 rotates therewith.

The fine dust-compressive rotation plate 346 compresses the fine dust collected in the second dust storing unit 320 while reciprocatingly rotating within the second dust storing unit 320. The principle that the fine dust-compressive rotation plate 346 compresses the fine dust is the same as the principle that the dust-compressive rotation plate 344 compresses the dust.

The fine dust-compressive rotation plate 346 is connected to the first rotating portion 342, and the first rotating portion 342 is moved along with the first cover 331. Therefore, the fine dust-compressive rotation plate 346 is also moved along the first cover 331. In detail, when the first cover 331 rotates based on a hinge 335 to close the first dust storing unit 310 and the second dust storing unit 320, the fine dust-compressive rotation plate 346 is inserted into the second dust storing unit 320. On the other hand, when the first cover 331 rotates based on the hinge 335 to open the first dust storing unit 310 and the second dust storing unit 320, the fine dust-compressive rotation plate 346 is drawn out of the second dust storing unit 320.

The dust collector 300 further includes a fine dust-compressive fixing plate 347.

The fine dust-compressive fixing plate 347 is fixed in the second dust storing unit 320 to induce a reciprocating rotation motion of the fine dust-compressive rotation plate 346 and restrict a movement of fine dust which is compressed by the fine dust-compressive rotation plate 346. The principle of the fine dust-compressive fixing plate 347 is the same as the principle of the aforementioned dust-compressive fixing plate 245, 345.

As illustrated, the fine dust-compressive fixing plate 347 protrudes from an inner circumferential surface of a second dust container 321 toward the rotation shaft 346' of the fine dust-compressive rotation plate 346. The fine dust-compressive fixing plate 347 and a dust-compressive fixing plate 345 may be installed at positions corresponding to each other.

The fine dust-compressive rotation plate 346 corresponds to the dust-compressive rotation plate 344. The fine dust-compressive fixing plate 347 corresponds to the dust-compressive fixing plate 345.

Since the fine dust is smaller than the dust, the fine dust stuck on an outer circumferential surface of the second dust container 321 may not be compressed by the fine dust-compressive rotation plate 346. To prevent this, an elastic member 348 may be coupled to an end portion of the fine dust-compressive rotation plate 346.

The elastic member 348 may be formed to correspond to the inner circumferential surface of the second dust container 321, and located between the fine dust-compressive rotation plate 346 and the inner circumferential surface of the second dust container 321. When the fine dust-compressive rotation plate 346 rotates, the elastic member 348 rotates along the fine dust-compressive rotation plate 346 while maintaining a contact state with the inner circumferential surface of the second dust container 321. The elastic member 348 thus helps even the fine dust stuck on the inner circumferential surface of the second dust container 321 to be compressed toward the fine dust-compressive fixing plate 347.

A frictional force may be generated by the elastic member 348, and thereby be likely to interfere with the rotation of the fine dust-compressive rotation plate 346. Therefore, the elastic member 348 is preferably formed to come in contact with the inner circumferential surface of the second dust container 321 as slight as possible to minimize the generation of the frictional force.

The elastic member 348 may also be applied to an end portion of the dust-compressive rotation plate 344. The elastic member 348 may also be applied to the exemplary embodiment illustrated in FIGS. 4 to 8.

As shown in FIG. 9, and similarly to the first embodiment, the first cover 331 is provided with a first sealing member 332 on an outer circumferential surface thereof to seal the discharge opening of the first dust storing unit 310. The second cover 333 is provided with a second sealing member 334 on an outer circumferential surface thereof to seal the discharge opening of the second dust storing unit 320. The dust collector 300 includes a coupling member 336 which prevents separation of the first cover 331 from the first dust container 311 until released by an external force.

Also as shown in FIG. 9, and similarly to the first embodiment, the first rotating portion 342 is provided with a plurality of protrusions 342a which are radially formed based on a center of rotation. The second rotating portion 343 is provided with accommodating portions 343a formed on an inner circumferential surface thereof such that end portions of the protrusions 342a are accommodated therein.

The protrusion 342a and the accommodating portion 343a are provided with inclined surfaces 342b and 343b corresponding to each other, respectively, so as to be slidably engaged with each other by inclination even at a position where they are not aligned with each other.

Unexplained numeral reference 305 indicates a first cyclone.

According to a dust collector disclosed herein, dust collected in a first dust storing unit and fine dust collected in a second dust storing unit may be compressed, and a discharge opening of the first dust storing unit and a discharge opening of the second dust storing unit may be simultaneously opened. The dust in the first dust storing unit and the fine dust in the second dust storing unit may be simultaneously discharged in the compressed state. Therefore, the dust collector can provide convenience optimized for a user who desires to discharge both the dust and the fine dust.

The configurations and methods of the dust collector and the vacuum cleaner having the same may not be limitedly applied, but such embodiments may be configured by a selective combination of all or part of the embodiments so as to implement many variations.

According to the present disclosure, a compression device may compress dust stored in a first or second dust storing unit, which may prevent scattering of the dust stored in the first or second dust storing unit.

Also, a lower cover part may be employed to simultaneously open a first dust container and a second dust container, such that dust collected and compressed in the first dust container and fine dust collected and compressed in the second dust container can be simultaneously discharged. Specifically, the dust and the fine dust can be compressed by the compression device so as to be easily dropped from the dust collector by gravity. This may more easily permit a user to discharge the dust and the fine dust.

In addition, the operation between the compression device and the lower cover part may provide convenience optimized for a user who desires to discharge the dust and the fine dust from the dust collector.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A dust collector comprising:
a first cyclone configured to separate dust from air;
a plurality of second cyclones located above the first cyclone and configured to separate fine dust from the air;
a first dust container;
a second dust container located in the first dust container;
a first dust storing unit having a hollow cylindrical shape located between an inner circumferential surface of the first dust container and an outer circumferential surface of the second dust container, the first dust storing unit being configured to collect the dust separated by the first cyclone;
a second dust storing unit located within the second dust container and surrounded by the first dust storing unit, the second dust storing unit being configured to collect the fine dust separated from the air by the second cyclones;
a lower cover part defining a bottom surface of the first dust storing unit and the second dust storing unit;
a hinge coupling the lower cover part to the first dust container, the hinge permitting the lower cover part to simultaneously open the first dust storing unit and the second dust storing unit to discharge the dust and the fine dust; and
a compression device rotatably connected to the lower cover part, the compression device being configured to reciprocatingly rotate within the first dust storing unit to compress the dust collected in the first dust storing unit,
wherein the lower cover part comprises:
a first cover configured to open and close a discharge opening of the first dust storing unit; and
a second cover configured to open and close a discharge opening of the second dust storing unit,
wherein the second dust container is spaced apart from the first cover along a height direction of the dust collector, and the second cover protrudes from the first cover toward the second dust container to be insertable into the second dust storing unit, and
wherein the compression device comprises:
a rotation gear configured to be rotatable by an external driving force;
a first rotating portion provided at an opposite side to the rotation gear based on the first cover and connected to the rotation gear to be rotatable along with the rotation gear;
a second rotating portion coupled to a circumference of the second dust container and engaged with the first rotating portion when the discharge opening of the second dust storing unit is closed by the lower cover part to be rotatable along with the first rotating portion; and
a dust-compressive rotation plate connected to the second rotating portion and configured to be rotatable along with the second rotating portion to compress the dust collected in the first dust storing unit.

2. The dust collector of claim 1, wherein a discharge opening of the first dust storing unit and a discharge opening of the second dust storing unit open substantially in the same direction.

3. The dust collector of claim 1, wherein the first cover is coupled to the first dust container by the hinge, and
wherein the second cover is connected to the first cover.

4. The dust collector of claim 1 further comprising:
a coupling member configured to couple the first dust container and the first cover to each other to prevent the separation of the first cover from the first dust container until released by an external force applied to the coupling member.

5. The dust collector of claim 1, wherein the rotation gear is coupled to the first cover and exposed externally of the dust collector,
wherein the second rotating portion is configured to be relatively rotatable with respect to the second dust container, and
wherein the dust-compressive rotation plate is configured to be rotatable along with the first rotating portion and the second rotating portion upon the rotation of the rotation gear.

6. The dust collector of claim 1, further comprising:
a dust-compressive fixing plate fixed in an area between the inner circumferential surface of the first dust container and the outer circumferential surface of the second dust container and configured to restrict a movement of the dust compressed by the dust-compressive rotation plate.

7. The dust collector of claim 1, wherein the second dust container includes a guide rail on an outer circumferential surface of the second dust container to guide the rotation of the second rotating portion, and
wherein the second rotating portion includes a guide protrusion engaged with the guide rail so that the second rotating portion is rotatable at the discharge opening of the second dust storing unit along the guide rail.

8. The dust collector of claim 1, wherein the first rotating portion includes a plurality of protrusions radially located about a center of rotation of the first rotating portion,
wherein the second rotating portion includes accommodating portions located on the inner circumferential surface of the second rotating portion and configured to accommodate end portions of the protrusions therein; and
wherein the first rotating portion and the second rotating portion are engaged with each other to be simultaneously rotatable when the end portions of the protrusions are accommodated within the accommodating portions.

9. The dust collector of claim 8, wherein the protrusions and the accommodating portions are provided with inclined surfaces corresponding to each other, such that the protrusions and the accommodating portions are engagable with each other by being slid along the inclined surfaces.

10. The dust collector of claim 1,
wherein the first rotating portion and a portion of the second rotating portion are rotatable in a space between the second dust container and the first cover, and
wherein the second cover is located on a rotation shaft of the first rotating portion and spaced from the first cover, the second cover being insertable into the second dust storing unit.

11. The dust collector of claim 10, wherein the first cover includes a first sealing member having a shape corresponding to the inner circumferential surface of the first dust container to seal the discharge opening of the first dust storing unit, and
wherein the second cover includes a second sealing member having a shape corresponding to the inner circumferential surface of the second dust container to seal the discharge opening of the second dust storing unit.

12. The dust collector of claim 11, wherein at least part of the first sealing member is inserted into the first dust storing unit when the first cover is coupled to the first dust container and pressed by the inner circumferential surface of the first dust container to thereby elastically change in shape, and
wherein at least part of the second sealing member is inserted into the second dust storing unit when the first cover is coupled to the first dust container and pressed by the inner circumferential surface of the second dust container to thereby elastically change in shape.

13. The dust collector of claim 12, wherein the second cover is connected to the first rotating portion to be relatively rotatable with respect to the first rotating portion, and
wherein the second sealing member restricts the rotation of the second cover by a frictional force between the second sealing member and the inner circumferential surface of the second dust container.

14. The dust collector of claim 1, wherein the compression device further comprises a fine dust-compressive rotation plate connected to the second rotating portion and configured to be rotatable along with the first rotating portion and the second rotating portion upon the rotation of the rotation gear, the fine dust-compressive rotation plate being configured to compress the fine dust collected in the second dust storing unit.

15. The dust collector of claim 14, wherein the fine dust-compressive rotation plate includes a rotation shaft connected to a rotation shaft of the first rotating portion through the second cover.

16. The dust collector of claim 14, wherein the fine dust-compressive rotation plate is inserted into the second dust storing unit when the first cover rotates about the hinge to close the first dust storing unit and the second dust storing unit, and
wherein the fine dust-compressive rotation plate is drawn out of the second dust storing unit when the first cover rotates about the hinge to open the first dust storing unit and the second dust storing unit.

17. The dust collector of claim 14, further comprising a fine dust-compressive fixing plate fixed in the second dust storing unit and configured to restrict a movement of the fine dust compressed by the fine dust-compressive rotation plate.

18. The dust collector of claim 17, wherein the fine dust-compressive fixing plate protrudes from the inner circumferential surface of the second dust container toward a rotation shaft of the fine dust-compressive rotation plate.

19. A vacuum cleaner comprising:
a cleaner main body;
a suction part configured to suck air containing dust into the cleaner main body by a suction force generated in the cleaner main body; and
a dust collector configured to separate the dust from the air sucked through the suction part and collect the separated dust, wherein the dust collector comprises:
a first cyclone configured to separate dust from air;
a plurality of second cyclones located above the first cyclone and configured to separate fine dust from the air;
a first dust container;
a second dust container located in the first dust container;
a first dust storing unit having a hollow cylindrical shape located between an inner circumferential surface of the first dust container and an outer circumferential surface of the second dust container, the first dust storing unit being configured to collect the dust separated by the first cyclone;
a second dust storing unit located within the second dust container and surrounded by the first dust storing unit, the second dust storing unit being configured to collect the fine dust separated from the air by the second cyclones;
a lower cover part defining a bottom surface of the first dust storing unit and the second dust storing unit;
a hinge coupling the lower cover part to the first dust container, the hinge permitting the lower cover part to simultaneously open the first dust storing unit and the second dust storing unit to discharge the dust and the fine dust; and
a compression device rotatably connected to the lower cover part, the compression device being configured to reciprocatingly rotate within the first dust storing unit to compress the dust collected in the first dust storing unit,
wherein the lower cover part comprises:
a first cover configured to open and close a discharge opening of the first dust storing unit; and
a second cover configured to open and close a discharge opening of the second dust storing unit,
wherein the second dust container is spaced apart from the first cover along a height direction of the dust collector, and the second cover protrudes from the first cover toward the second dust container to be insertable into the second dust storing unit, and
wherein the compression device comprises:
a rotation gear configured to be rotatable by an external driving force;
a first rotating portion provided at an opposite side to the rotation gear based on the first cover and connected to the rotation gear to be rotatable along with the rotation gear;
a second rotating portion coupled to a circumference of the second dust container and engaged with the first rotating portion when the discharge opening of the second dust storing unit is closed by the lower cover part to be rotatable along with the first rotating portion; and
a dust-compressive rotation plate connected to the second rotating portion and configured to be rotatable along with the second rotating portion to compress the dust collected in the first dust storing unit.

20. The vacuum cleaner of claim 19, wherein the first cover is coupled to the first dust container by the hinge,
wherein the second cover is connected to the first cover,
wherein the rotation gear is coupled to the first cover and exposed externally of the dust collector,
wherein the second rotating portion is configured to be relatively rotatable with respect to the second dust container,
wherein the dust-compressive rotation plate is configured to be rotatable along with the first rotating portion and the second rotating portion upon the rotation of the rotation gear, and
wherein the compression device further comprises a fine dust-compressive rotation plate connected to the second rotating portion and configured to be rotatable along with the first rotating portion and the second rotating portion upon the rotation of the rotation gear, the fine dust-compressive rotation plate being configured to compress the fine dust collected in the second dust storing unit.

* * * * *